United States Patent [19]

Schramm et al.

[11] 4,242,995
[45] Jan. 6, 1981

[54] PERFORMANCE OPTIMIZING CONTROL SYSTEM FOR AN INTERNAL COMBUSTION ENGINE

[75] Inventors: Herbert Schramm, Stuttgart; Bert Wurst, Möglingen, both of Fed. Rep. of Germany

[73] Assignee: Robert Bosch GmbH, Stuttgart, Fed. Rep. of Germany

[21] Appl. No.: 925,990

[22] Filed: Jul. 19, 1978

[30] Foreign Application Priority Data

Sep. 2, 1977 [DE] Fed. Rep. of Germany ....... 2739508

[51] Int. Cl.³ .............................................. F02P 5/04
[52] U.S. Cl. ..................................... 123/425; 123/352
[58] Field of Search .......... 123/117 R, 117 A, 32 EA, 123/32 EE

[56] References Cited

U.S. PATENT DOCUMENTS

| | | | |
|---|---|---|---|
| 2,628,606 | 2/1953 | Draper | 123/117 R |
| 3,142,967 | 8/1964 | Schweitzer | 123/117 A |
| 3,587,764 | 6/1971 | Bowles | 123/117 R |
| 3,596,643 | 8/1971 | Schweitzer | 123/117 A |
| 3,791,357 | 2/1974 | Cook | 123/117 R |
| 3,831,564 | 8/1974 | Schmidt | 123/32 EE |
| 3,875,907 | 4/1975 | Wessel | 123/32 EE |
| 3,900,012 | 8/1975 | Wahl | 123/32 EE |
| 4,026,251 | 5/1977 | Schweitzer | 123/32 EA |
| 4,064,846 | 12/1977 | Latsch | 123/32 EA |
| 4,130,863 | 12/1978 | Schweitzer | 123/32 EA |

*Primary Examiner*—Ronald B. Cox
*Attorney, Agent, or Firm*—Frishauf, Holtz, Goodman & Woodward

[57] ABSTRACT

To match the control adjustment speed of an internal combustion engine control system to operating speed thereof, a control loop is provided which includes an operating parameter sensor, a correlator comparing a sensed signal with an oscillating command signal, a controller responsive to a consequent error signal and which then controls operation of the engine; a speed transducer provides speed-dependent output signals which control (a) the frequency of oscillation of the oscillator and (b) the operating speed of the controller. If the controller is an integrating-type controller, then the time constant of the integrator thereof is changed, for example by varying a resistance value of an R/C circuit as a function of engine speed.

10 Claims, 5 Drawing Figures

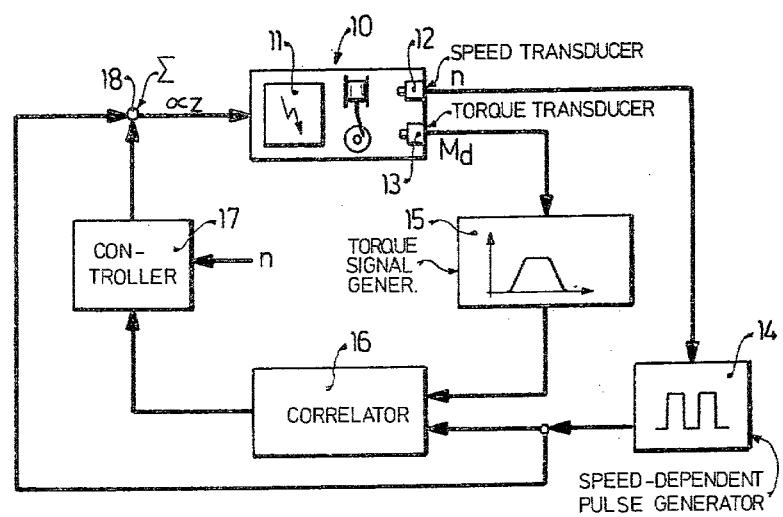
FIG. 1
FIG. 2
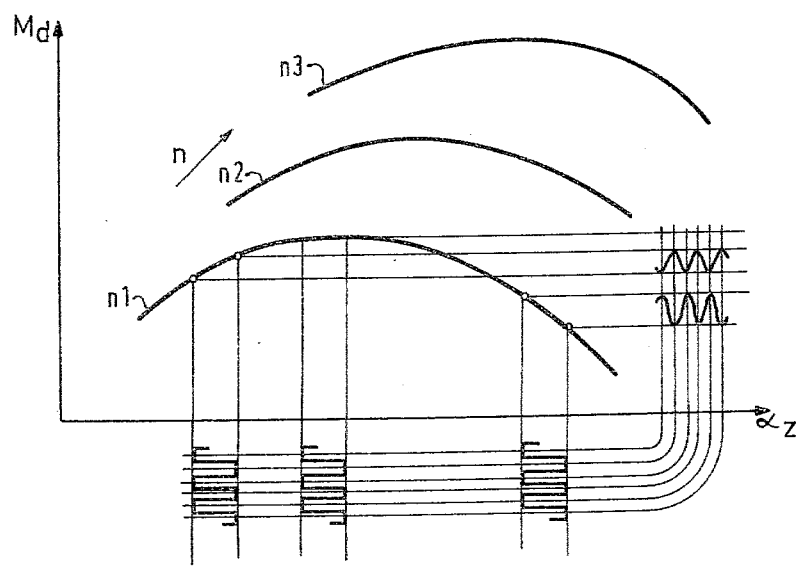

PERFORMANCE OPTIMIZING CONTROL SYSTEM FOR AN INTERNAL COMBUSTION ENGINE

Reference to related publications:

"Kleines Handbuch technischer Regelvorgänge" ("Small Handbook of Control Steps in Engineering") by Windfried Oppelt, publisher Verlag Chemie GmbH, 1964, pages 651 to 653.

Dissertation by Dr. Martin Zechnall "Extremwertregelung am Beispiel der Gemischbildung eines Otto-Motors" ("Extreme Value Regulation, for example to Control the Mixture Formation in an Otto-Motor"), at Technische Universität Braunschweig (Technical University Braunschweig), 1973.

U.S. Pat. No. 3,142,967, Schweitzer.

U.S. Pat. No. 3,874,351, Adler et al. (assigned to the assignee of this application).

The present invention relates to a performance optimizing control system for an internal combustion engine, for example of the automotive type, in which the combustion engine is to be controlled to operate at a maximum operating parameter, for example supplying maximum torque under given operating conditions.

BACKGROUND AND PRIOR ART

The principle of controlling the performance of an engine or other device with respect to a maximum value is known—see the referenced handbook relating to control systems and control steps. The dissertation by Dr. Zechnall discloses the application of control principles to internal combustion engines of the Otto type to control the relative proportion of fuel and air in the fuel-air mixture for maximum performance in accordance with desired characteristics. U.S. Pat. No. 3,142,967, Schweitzer also describes control of extreme values or maxima in connection with internal combustion engines.

The various references disclose the use of controllers having parameters of essentially constant time levels. As a consequence, the adjustment or control speed is always the same, independently of the availability of sensing or measuring data with respect to time. The speed of control in a control loop, and thus the control parameters must be arranged, when applied to internal combustion engines, for low speed of the engine. Low speed of the engine refers to a small or low availability of data and information for any unit of time for the controller. If the engine operates at a higher speed, then the control loop will not adequately follow the performance of the engine since the response speed of the control system will be governed by its initial design—which must also accomodate low speeds. If the response speed of the control system is set to respond quickly, that is, operates best with high engine speeds, then it is possible that, when the engine operates at low speeds, control oscillations or hunting about the desired extreme will result; the amplitude of hunting, that is, the deviation and swing about the desired extreme value can be comparatively large.

THE INVENTION

It is an object to provide a control system to optimize the performance of an internal combustion engine in which the dynamics of the control loop are independent of the instantaneous operating conditions, so that the control effectiveness and quality will be essentially uniform over the entire operating range of the engine.

Briefly, an operating parameter, for example torque of the engine is sensed, and a parameter signal corresponding to the sensed parameter is provided. A correlator compares an oscillating command signal and the parameter signal and provides an error signal to a controller which controls a regulator to regulate a performance parameter of the engine as a function of the error signal. The frequency of oscillation is made speed dependent. A control loop is formed thereby which includes the engine, the operating parameter sensing means, the correlator and the controller and regulator. The control parameter which is responsible for the adjustment speed of the control loop is controlled as a function of the speed of the engine, so that the control actions, and the frequency of oscillation about the desired level can be matched to the actual speed requirements of the engine at any instant of time in the light of the then existing operating speed thereof.

In accordance with a preferred form of the invention, a speed signal is derived from the engine and connected to control the adjustment speed of the control means and thus to control the response of the control loop as a function of engine speed.

The control dynamics of the loop will thus be independent of instantaneous operating conditions and will always be the same, so that the control quality over the entire control range will be optimized.

In a preferred form, the controller is either an integral controller or a delayed proportional controller; the controlled parameter in either case, preferably, is the time constant of the controller, as used.

Drawings, illustrating preferred examples, wherein:

FIG. 1 is a general block diagram of an optimizing system;

FIG. 2 is a series of graphs illustrating the operation of the system of FIG. 1 wherein the extreme is a maximum;

Figure 3:
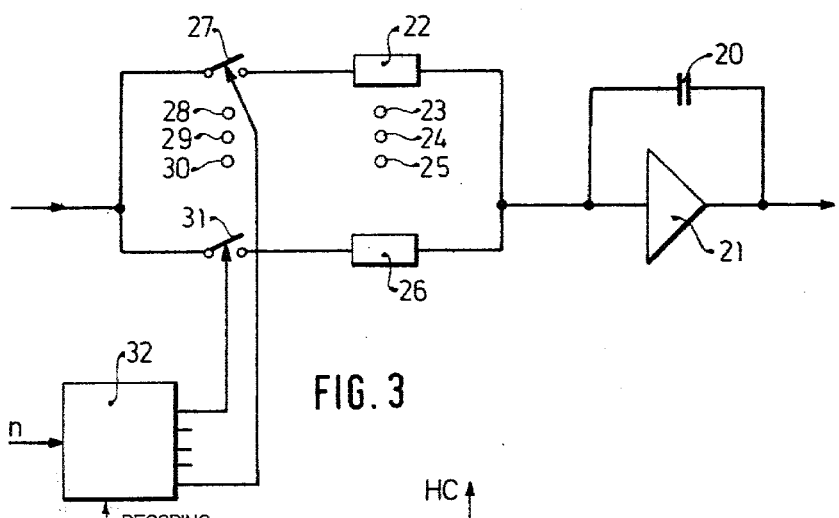
FIG. 3 is a more detailed diagram of one form of a speed-dependent controller.

The invention will be explained in connection with a gasoline-type internal combustion engine 10 of the automotive type. Engine 10, shown only schematically, has an ignition system 11 which may be of any known and suitable type, in which the ignition instant or timing can be changed in dependence on a control voltage. U.S. Pat. No. 3,874,351, Adler et al. discloses such a system. Engine 10 has two sensors, namely a speed transducer 12 providing a speed output signal n, and a torque transducer 13 providing a torque output signal Md. The torque Md is difficult to measure directly; as an approximation, however, the average pressure in a cylinder of the internal combustion engine is roughly equivalent to output torque and thus can be taken as a measure for the torque. The torque signal can, therefore, be obtained for example by a piezoelectric pressure transducer which is exposed to combustion chamber pressure, the pressure transducer then being connected to an evaluation circuit which provides necessary amplification and/or signal processing to provide an output signal which, essentially, is representative of torque of the engine. It is also possible to obtain a torque signal Md from the speed signal, particularly in combination with signals derived, for example, from vacuum in the induction pipe to the engine, or other operating parameters.

The output signal of the speed transducer 12 is applied to a pulse generator 14 which provides an output frequency dependent on speed as transduced by transducer 12. For example, frequency generator 14 may be a frequency multiplier or a divider; for example, the frequency of the signal derived from transducer 12 may be divided by the number of pulses or pulse undulations of the signal derived from speed transducer to obtain a signal directly proportional to revolution; the type of signal derived from the speed transducer 12 will depend on its nature. In any event, the pulse generator 14 is so arranged that its output frequency will correspond to, or be representative of rotational speed of engine 10. This output frequency can be further divided, or otherwise processed by the frequency generator 14. If a low-speed signal is desired, the speed transducer 12 may be responsive to provide an output signal once only for each revolution of the engine 10. The generator 14 may then not be strictly necessary and could be replaced by a wave-shaping circuit.

Transducer 13 is connected to a torque signal generator 15 which, for example, may be a band-pass filter to filter out disturbance frequencies. The signal generator 15 is connected to one input of a correlator 16, the second input of which is connected to the speed transducer 12 through the pulse generator 14, or similar circuit. The output of correlator 16 is connected to a controller 17 which, in turn, is connected to a summing circuit 18. The second input of the summing circuit is derived from the speed signal and, as shown, is taken from the output of the pulse generator 14. The output of summing circuit 18 is connected to a control input of the ignition system 11.

Operation, with reference to FIG. 2: FIG. 2 shows the relationship of torque Md and ignition timing $\alpha z$ for three speeds n1, n2, n3, in which n3 is a higher speed than n1. The output signal of frequency generator 14 is superimposed over the control signal for the ignition timing $\alpha z$ so that the actual ignition timing instant oscillates over a small range, for example about 3° of crankshaft angle of the engine 10. The frequency of frequency generator 14 then, preferably, is so set that, after a predetermined number of ignition pulses, the ignition timing will change by this small value. The number of ignition pulses could, for example, match the number of cylinders of the engine. The frequency may, of course, be less or may be so high that the ignition timing instant is changed or shifted after each ignition pulse. The frequency of frequency generator 14 is not fixed, but changes with changes in engine speed. The output signals of the frequency generator 14 which cause this small shift in the ignition timing are illustrated as square wave signals beneath the abscissa of FIG. 2. Changes in the torque will result due to these small changes in ignition timing. If the changes of this ignition timing instant are approximately at the maximum of the torque curve, then the amplitude of variation of torque is effectively zero or null. Variations in torque do arise, however, at either sides of the maximum of the torque curve; on one side there is phase coincidence with respect to the ignition timing variations; at the other side of the maximum, the phases are opposed to each other. Phase comparison between variations in torque and the output signals from frequency generator 14 is done in the correlator 16. Controller 17 will generate an adjustment or error signal which tends to shift the ignition timing instant in one or the other direction. The operating speed of adjustment by controller 17 is controlled in dependence on the speed of the engine, as schematically indicated by the application of the speed signal n to the controller 17, and as will be discussed in detail in connection with FIGS. 3 and 4. The recurrence rate of the signals applied to controller 17 are also speed dependent. Control of a parameter need not be with respect to a maximum, but can be with respect to any value below the maximum, for example. This can be obtained by introducing suitable threshold stages into the system. Rather than using a predetermined torque as the maximum parameter for which control is to be effected, other parameters may likewise be used, for example minimum noxious exhaust emission, minimum fuel consumption, maximum possible silence, smoothness or quietness of operation, or the like. It is possible to always control the system in accordance with a maximum or minimum value.

For further details of such systems, attention is directed to the referenced publications.

FIG. 3 illustrates an integral controller which is speed-dependent controlled. The controller has a control amplifier 21, for example an operational amplifier which is bridged by a capacitor 20 to give the controller integrating characteristics. The controller has a plurality of input resistors 22, 23 . . . 26, in which resistors 23–25 are shown merely as dots to simplify the drawing. Each one of the resistors is serially connected to a switch 27, 28 . . . 31, in which, again, switches 28–30 are shown as dots for simplicity. Closing of the respective switches 27 to 31 is controlled by a decoding stage 32 which has a speed-dependent signal applied thereto. Decoding stage 32 may, for example, comprise one or more threshold circuits which sequentially respond in dependence on a parameter or value of the speed signal n and accordingly control opening or closing of switches 27 to 31. The integrating time T of such an integrating controller is then determined by the equation $$T = R \times C$$

in which R is the resistance value of the input resistor, and C the capacity of the feedback capacitor 20. Upon changing the input resistance R, for example decreasing the effective input resistance by connecting one or more of the resistors 22 . . . 26 in parallel, or connecting resistors of lower resistance value, then the integrating time will decrease and the controller will respond more rapidly. The reverse, of course, will obtain upon increase of the resistance.

Figure 4:
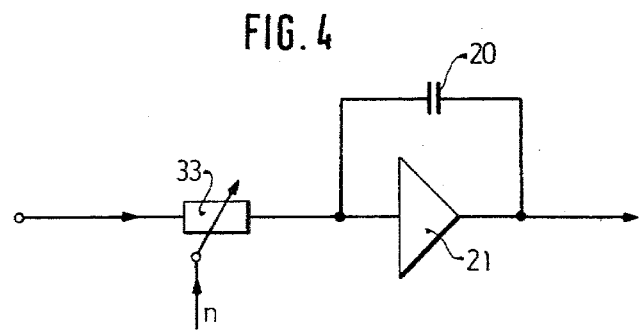
FIG. 4 illustrates another embodiment of a speed-dependent controller.

FIG. 4 illustrates another embodiment in which the discrete, stepped resistors 22 . . . 26 are replaced by a single stepless controllable potentiometer-type resistor 33. Resistor 33 may, for example, be a controlled semiconductor having an effective resistance which is controlled to depend on an input signal which is representative of speed. Resistor 33 may, of course, also be a potentiometer which is operated by a small positioning motor controlled in accordance with the speed signal n applied thereto.

The entire control concept can be readily implemented by a microprocessor system as is frequently used in current control technology.

Figure 5:
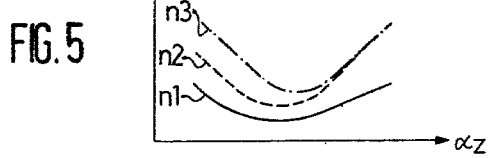
FIG. 5 is a graph illustrating the operation of the system when the extreme value is a minimum.

FIG. 5 illustrates control to a minimum, for example minimum exhaust emission in dependence on ignition timing, wherein the abscissa of FIG. 5 indicates the crankshaft position, in degrees with respect to a reference, for example top dead center (TDC) position of a piston, at which the ignition pulse occurs. The ordinate represents emissions of unburned fuel components of the air-fuel mixture, for example hydrocarbons and carbon monoxide; curves n1, n2, n3 again represent the respective emission characteristics as a function of ignition timing, that is, of spark advance or retardation with respect to the reference TDC position.

Various changes and modifications may be made within the scope of the inventive concept.

We claim:

1. Performance optimizing control system for an internal combustion engine (10) having
   means (13) sensing an operating parameter (Md) of the engine and providing a parameter signal;
   speed transducer means (12) providing a speed-dependent signal;
   regulating means (11, 18) regulating the timing of a periodic event in the engine which controls performance thereof;
   oscillating command signal generating means (14) generating a command signal which oscillates about a commanded datum;
   correlator means (16) connected to said command signal and to said parameter signal and providing an error signal;
   and control means (17) controlled by said error signal and providing a control signal to said regulating means to regulate the timing of said periodic event as a function of said error signal and to form, with said engine (10), the operating parameter sensing means (13) and the correlator (16), a closed control loop, the control means operating with a controlled regulating speed to affect the control regulation of said loop;
   and wherein, in accordance with the invention,
   (a) the command signal generating means is connected to and controlled by the speed-dependent signal to increase the frequency of oscillation with increase in speed and
   (b) the control means (17) are connected to and controlled by said speed-dependent signal to render the controlled regulating speed dependent on the speed of the engine (10).

2. System according to claim 1, wherein the control loop includes a frequency generator (14), the frequency generator providing an output frequency representative of speed of the engine to vary the timing of said periodic event in an oscillatory manner at a frequency which is speed-dependent.

3. System according to claim 2, wherein the frequency generator is connected to and controlled by the speed transducer means (12), and the output frequency is a division of the input frequency.

4. System according to claim 1, wherein (FIG. 2) the control loop is adjusted to optimize performance with respect to a maximum of an operating parameter (Md) of the engine.

5. System according to claim 1, wherein (FIG. 5) the control loop is adjusted to regulate the performance of the engine with respect to a minimum of an operating parameter (CO; HC) of the engine.

6. System according to claim 1, wherein the control loop is adjusted to regulate the performance of the engine with respect to a predetermined value below an extreme value of an operating parameter of the engine.

7. System according to claim 1, wherein at least one control parameter of the engine is speed-dependent.

8. System according to claim 7, wherein the control means (17) comprises a control amplifier having input resistance; and wherein the resistance value of the input resistance of said control amplifier is variable as a function of engine speed.

9. System according to claim 8, wherein (FIG. 3) the input resistance of the control amplifier comprises a plurality of resistors (22 . . . 26);
   a decoding stage (32) is provided, connected to and controlled by the speed signal (n) representative of speed of the engine, the decoding stage providing command signals to the plurality of resistors to switch in respective resistance values as input resistance to the control means to adjust the input resistance as a function of speed, as decoded in the decoding stage.

10. System according to claim 8, wherein the input resistance comprises a controlled variable resistor, the resistance value of which is controlled in dependence on the speed of the engine.

* * * * *